United States Patent
Lisec et al.

[11] Patent Number: 6,129,002
[45] Date of Patent: Oct. 10, 2000

[54] VALVE ARRANGEMENT, ESPECIALLY FOR A PNEUMATIC CONTROL SYSTEM

[75] Inventors: Thomas Lisec; Bernd Wagner; Martin Kreutzer, all of Berlin, Germany

[73] Assignee: Fraunhofer-Gesellschaft zur Förderung der angewandten Forschung e.V., Munich, Germany

[21] Appl. No.: 08/860,405

[22] PCT Filed: Dec. 20, 1995

[86] PCT No.: PCT/DE95/01852

§ 371 Date: Jun. 23, 1996

§ 102(e) Date: Jun. 23, 1996

[87] PCT Pub. No.: WO96/19689

PCT Pub. Date: Jun. 27, 1996

[30] Foreign Application Priority Data

Dec. 21, 1994 [DE] Germany .............................. 44 45 686

[51] Int. Cl.[7] .................................................. F15B 13/04
[52] U.S. Cl. ........................ 91/454; 251/129.17; 251/331
[58] Field of Search ...................... 91/454, 457; 60/403, 60/404; 251/65, 129.01, 129.06, 129.17, 331, 129.14; 137/522; 417/413

[56] References Cited

U.S. PATENT DOCUMENTS

| | | | |
|---|---|---|---|
| 3,768,875 | 10/1973 | Davis et al. | 91/454 |
| 4,516,605 | 5/1985 | Taplin | 91/454 |
| 4,580,598 | 4/1986 | Itoh | 91/454 |
| 4,895,500 | 1/1990 | Hok et al. | 417/566 |
| 5,219,278 | 6/1993 | Van Lintel | 417/413 |
| 5,323,999 | 6/1994 | Bonne et al. | 251/11 |

*Primary Examiner*—F. Daniel Lopez
*Attorney, Agent, or Firm*—Karl Hormann

[57] ABSTRACT

A valve arrangement including a micro-valve at an intake opening and a further valve at an output opening of a chamber connecting to a pressure-variable switching member, the valves being structured to maintain a closed state by an applied pressure difference. At least the micro-valve is provided with a closure member which can be energized to affect a change-over from one state to another. No energy is required to maintain the changed-over state.

9 Claims, 4 Drawing Sheets

| $P_{in}$ (bar) | Pulse (ms) | Power (mWs) | $T_{on}$ (ms) | $T_{off}$ (ms) |
|---|---|---|---|---|
| 1.0 | 30 | 130 | 21 | 31 |
| 1.5 | 35 | 160 | 23 | 41 |
| 2.0 | 40 | 180 | 29 | 48 |
| 2.5 | 50 | 230 | 36 | 59 |
| 3.0 | 70 | 310 | 47 | 72 |
| 3.5 | 100 | 450 | 60 | 105 |

FIG. 5

VALVE ARRANGEMENT, ESPECIALLY FOR A PNEUMATIC CONTROL SYSTEM

BACKGROUND OF THE INVENTION

1. Field of the Invention

The invention relates to a valve arrangement and, more particularly, to a pneumatic control system.

2. The State of the Art

Pneumatic control systems are widely used because of their efficiency, robustness and long life. In the simplest case, a pneumatic switching element (piston, membrane) is activated by an electropneumatic transducer using pressurized air as the pressure medium. The switching element, in turn, manipulates a flow of gas or fluid. All switching elements suffer from leakage to a greater or lesser extent. For that reason, a pilot valve has to be kept in a permanently open state under a corresponding supply of energy, in order to maintain the switching element in its deflected position. In its activated state, an electromagnetic solenoid valve requires a holding power of about 1 W.

OBJECTS OF THE INVENTION

It is a task of the instant invention to provide a valve arrangement which consumes energy only for the actual switching operation from one state to another and which is capable of maintaining its selected state without power.

The invention solves the task by a valve arrangement including a micro-valve at an intake opening and a further valve at the output opening of a chamber constituting a connection to a pressure-variable setting element, the valves being structured to maintain a closed state by an applied pressure difference, the micro-valve being provided with at least one valve seat and a movable closure member having an open switching position, a closed switching position and an idle state deviating therefrom which is not maintained by the valve in either its open or its closed position and in which a gap is open between the valve seat and the closure member and is dimensioned such that any loss of pressure medium in the chamber as a result of leakage is compensated for by pressure medium flowing through the gap. Special embodiments of the valve arrangement will additionally be described hereinafter.

The valve arrangement in accordance with the invention consists of a chamber having at least two valves, viz.: an intake valve and an output valve. The input flow of a pressure fluid (e.g. a gas) to a switching element connected with the chamber is controlled by the intake valve. The switching element may, for instance, be a piston which is moved with a cylinder by the applied pressure. The output valve controls the outflow of the pressure fluid from the switching element which is thus returned to its initial state.

The valve arrangement is characterized by the fact that the intake valve is a microvalve provided with a valve seat and a closure member which aside from an open and closed switching state may also assume an idle state different from either its closed or open states. Whereas the open and closed states of the valve are switched by external means (e.g. pressure, temperature, electric voltage), the closure member (e.g. a membrane or diaphragm) will assume its idle state when no external means are active, i.e. when it is not maintained in either its open or in its closed state. In this sense, a pressure difference exceeding a certain minimum value applied to the valve is to be understood to be an external means. The two valves are structured such that they are maintained in their closed state by an applied pressure difference. In the idle state, a gap is formed between the valve seat and the movable member, the gap being dimensioned to compensate for leakage flows at the movable member or other parts of the valve arrangement for by pressure fluid entering through the gap. In a currently preferred embodiment, the width of the gap may be selected such that at a predetermined (critical) pressure difference applied to the valve, the closure member, because of the aerodynamic effect, is pressed against the valve seat by the resulting flow of pressure fluid, that is to say, it will close automatically (closed state).

The gap may very easily and reproducibly be formed (for instance by dry etching) during fabrication of the micro valve by employing particular fabrication and structuring techniques of silicon technology. The width of the gap may, for instance, be between 10 and 100 μm.

Of course, it is also possible to utilize several intake valves of the mentioned type or several output valves side by side in the valve arrangement. Also, valves having several valve seats and closure members may be used. Because of the manner in which it functions, the valve arrangement has the properties of a 3/2 way valve (hereinafter also called switch) with two switching positions. In the first switching position, the output valve is closed and the intake valve is open or in its idle state. In the second position, the intake valve is closed and the output valve is open or in its idle state.

In another embodiment, the output valve is also a micro valve having a special idle state.

The operational mode of the valve arrangement with respect to the movement of a piston acting as the control or switching element will be explained with reference to this embodiment (see FIGS. 2 and 3).

If the intake valve is briefly activated (opened), the chamber within which the piston is movable will be filled with pressure fluid, e.g. a gas, so that the piston is moved out of its initial position. The closure member of the output valve (exhaust valve) is pressed against the valve seat, i.e., the output valve is closed (because of the differential pressure at the output valve), gas will flow through the intake valve until an input pressure $p_{in}$ has been reached. During this operation, the pressure difference at the intake valve is reduced. The intake valve may now be turned off. Since there is no pressure drop at this valve, its closure member will not engage the valve seat, i.e., it is in its idle position and leakages flows may be replenished or compensated for by gas flowing through the gap. The output valve is maintained in its closed state by the pressure difference acting on it ($p_{in}$>$p_{out}$)

The cylinder chamber of the piston is evacuated by briefly energizing the output valve. This results in a pressure difference at the intake valve 7 the closure member of which will be pressed against the valve seat by the gas flow. The chamber at the piston will be exhausted down to a $p_{out}$ pressure. The piston returns to its initial position. The output valve may be switched off, since no pressure is acting at it at this time (idle state). Any leakage flows in the arrangement will be replenished through the appropriately dimensioned gap of the output valve. The intake valve will be maintained in its closed state by the pressure difference effective at it. Closure of the intake and output valves may also be achieved, of course, by controlled energization of external means. The operating principles of the valves utilized are immaterial relative to the inventive function of the valve arrangement. Thus, it would be possible to apply magnetic, piezo-electric or thermo-mechanic operating principles.

The valve arrangement in accordance with the invention consumes energy only during a change-over operation between its two switched states and it is capable of maintaining either state without energy consumption. In its idle state (without energy), any loss of pressure medium at the switching element is advantageously compensated for by pressure medium replenished through the gap. Thus, the special advantage of the valve arrangement is its low energy consumption which is of significant importance in applications involving pneumatic controls.

If, intake and output valves are structured similarly, a change-over between the two switched states may be affected simply by actuating one of the valves. This does not require additional energy.

DESCRIPTION OF THE SEVERAL DRAWINGS

Structures of embodiments of the valve arrangement in accordance with the invention will hereinafter be described in detail with reference to the drawings and exemplary embodiments.

In the drawings:

FIG. 5 depicts the result of the measurement;

DETAILED DESCRIPTION OF THE SEVERAL EMBODIMENTS

Figure 1:
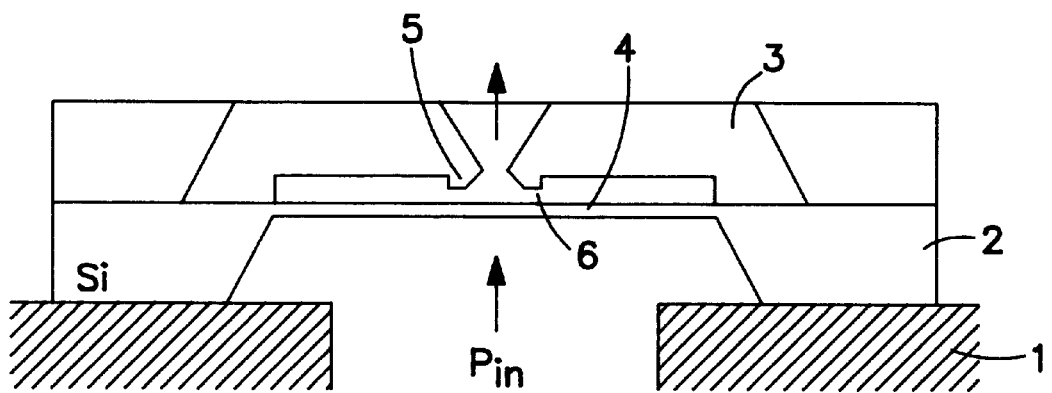
FIG. 1 depicts an embodiment of a schematic structure of a micro valve utilized as an intake valve in the valve arrangement in accordance with the invention.

FIG. 1 schematically depicts a micro valve suitable for use in a valve arrangement in accordance with The invention. The micro valve which is mounted on a Ceramic chip support 1, for instance, consists, in the Embodiment shown, of a silicon substrate 2 connected, for instance by bonding, to a second silicon body 3. The silicon substrate 2 is provided with a membrane or diaphragm 4 functioning as a closure member positioned opposite a valve seat 5 formed to surround a through-bore (valve opening) in the second substrate body 3. During fabrication of the valve, a gap 6 is formed (e.g. by dry etching) between the membrane 4 and the valve seat 5. The gap 6 may be dimensioned such that the membrane is pressed against the valve seat 5 by a small pressure difference acting on the valve. The valve will then be closed. It will be maintained in its closed state as long as the pressure difference is maintained, i.e. as long as the input pressure is larger than the output pressure ($p_{in} > p_{out}$). When the valve is actuated (to be opened) the membrane 4 will be lifted off the valve seat 5 against an effective pressure $p_{in}$. This results in the opening of the valve opening. The operation may be accomplished in different well-known ways, such as, for instance, magnetically, piezo-electrically or thermo-mechanically.

Figure 2:
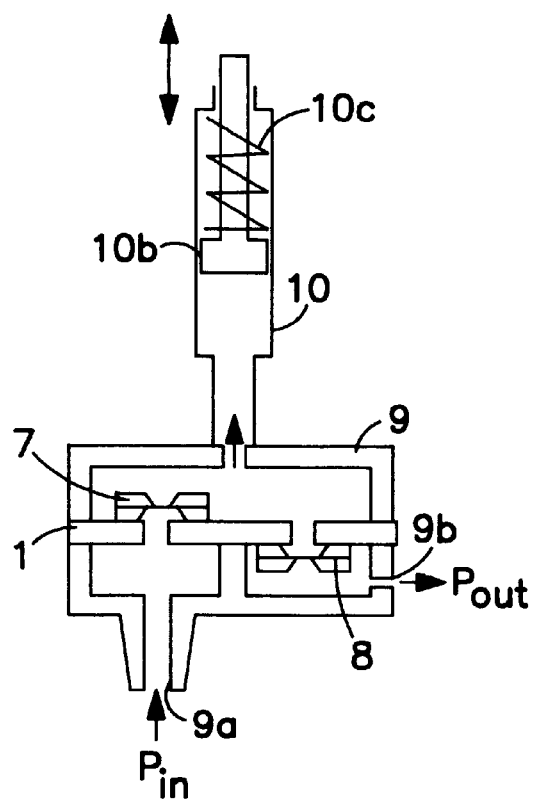
FIG. 2 shows an embodiment of a valve arrangement in accordance with the invention.

An examplary valve arrangement in accordance with the invention is depicted in FIG. 2. In this example, an intake valve 7 and an output valve 8 are mounted on a common chip support 1. The chip support is located within a housing 9 which forms an intake duct 9a (pressure $p_{in}$) and an output duct 9b (pressure $p_{out}$). A miniature cylinder 10a with a piston 10b is connected to the housing 9, the piston 10b constituting a switching element controlled by the valve in accordance with the invention. The miniature piston 10b is moved upwardly against the bias of a return spring 10c by pressure $p_{in}$ as soon as the intake valve 7 is opened and output valve 8 is closed. Once pressure $p_{in}$ has been established at the piston 10b, the intake valve 7 will assume its idle state by turning off the energization needed for its opening. The leakage at the piston 10b or from the housing is replenished or compensated for by gas flowing through the gap of the intake valve 7. In this manner, pressure losses at the switching element are avoided. Upon closure of the intake valve and opening of the output valve 8, the cylinder chamber behind the piston 10b will be exhausted down to pressure $p_{out}$ ($p_{in} > p_{out}$) so that the spring 10c biases the piston 10b to its initial position (not shown). Of course, the switching element could be directly integrated into the upper portion of the housing. Also, energization of the intake and output valves could be arranged directly on the chip support 1. In accordance with a further embodiment, both valves 7 and 8 may be integrated on a common chip.

Figure 3:
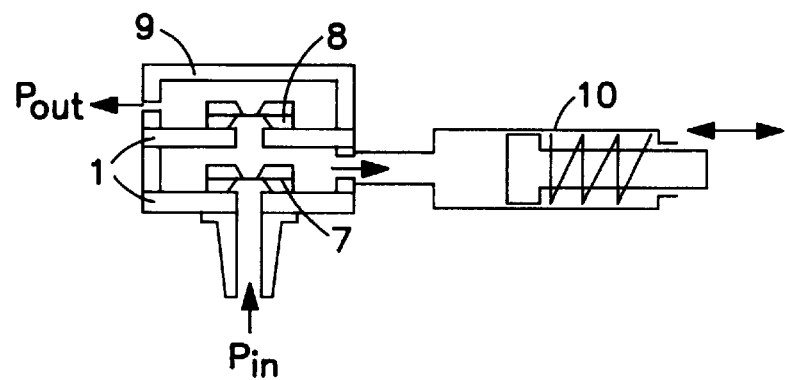
FIG. 3 shows a further embodiment of a valve arrangement in accordance with the invention.

FIG. 3 depicts a further embodiment of a valve arrangement in accordance with the invention. The arrangement operates in the manner already described in connection with FIG. 2. In this embodiment, intake and output valves 7 and 8 are mounted on separate chip supports 1 arranged in superposition in a housing 9. The switching element, i.e. cylinder 10a, piston 10b and spring 10c is provided laterally of the housing 9. In this embodiment, the valve arrangement in accordance with the invention is provided with microvalves which operate on the basis of well-known principles of thermo-mechanics thermo-pneumatics. In this embodiment, the width of the gap 6 (see FIG. 1) is structured to be about 30 μm. The dimensions of the entire valve arrangement are about 10× 10×7 mm. Because of the volumes of the valve arrangement of the piston, switching times are very short.

Figure 4:
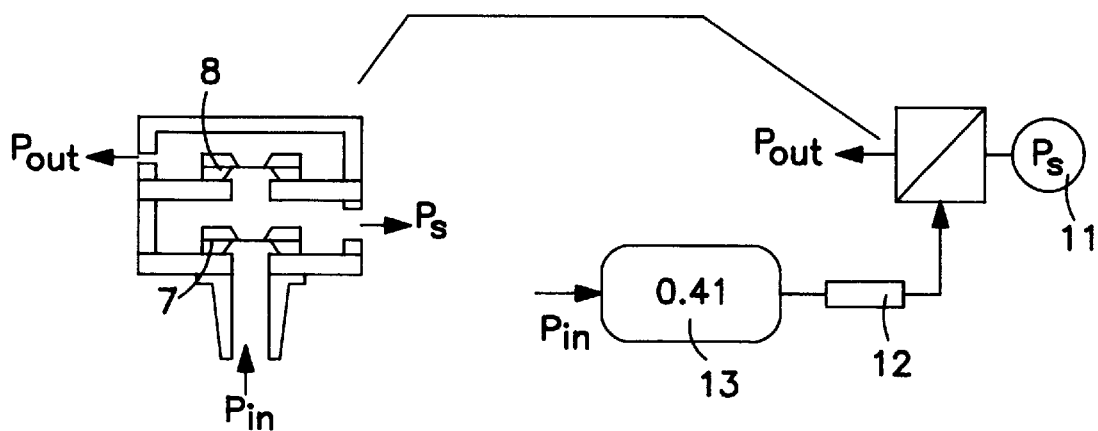
FIG. 4 shows a schematic presentation of a measurement system for measuring the time constants of the valve arrangement.

FIG. 4 depicts the structure of a measuring arrangement for examining the dynamic behavior of the bistable switch. A temperature-compensated silicon pressure sensor 11 was connected to the valve arrangement instead of the miniature cylinder and piston of the kind shown in FIGS. 2 and 3. Gas flow during a switching operation was measured by a silicon flow rate sensor 12 (delay 3 ms). To reduce oscillations in the feed line, a pressure storage 13 having a capacity of 0.4 l was provided ahead of the flow rate sensor.

Measured values corresponding to different input pressures $p_{in}$ are shown in FIG. 5. $T_{on}$ corresponds to the interval needed to establish 90% of the $p_{in}$ value at the pressure sensor 11 (pressure $p_s$) Correspondingly, $T_{off}$ is the time required for $p_s$ to drop to 10% of $p_{in}$. In this example, the length of the energization pulse for opening the valves is between 30 and 100 ms.

Figure 6:
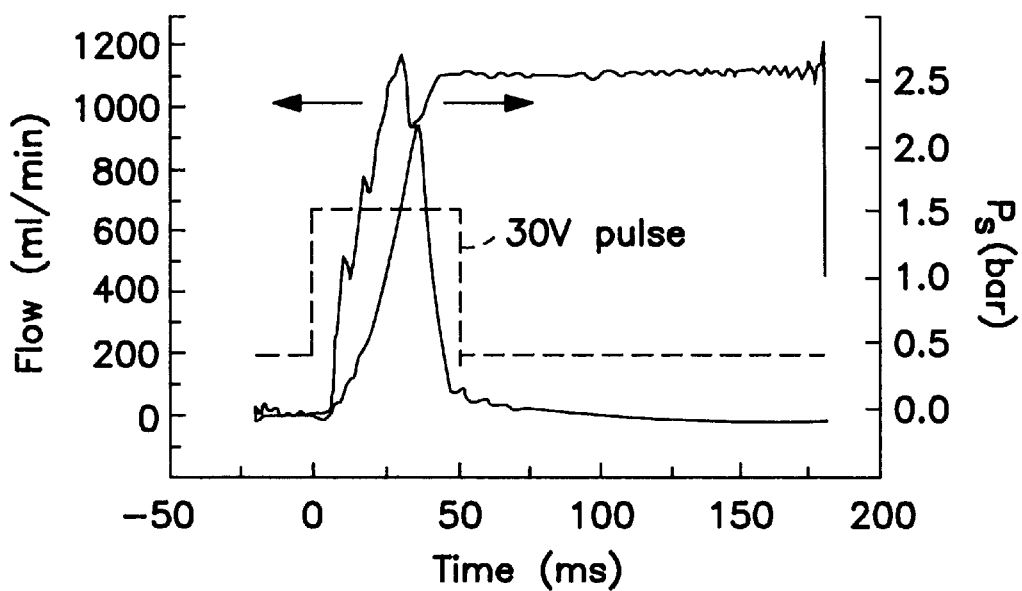
FIG. 6 depicts a measurement curve of the opening of the intake valve.
Figure 7:
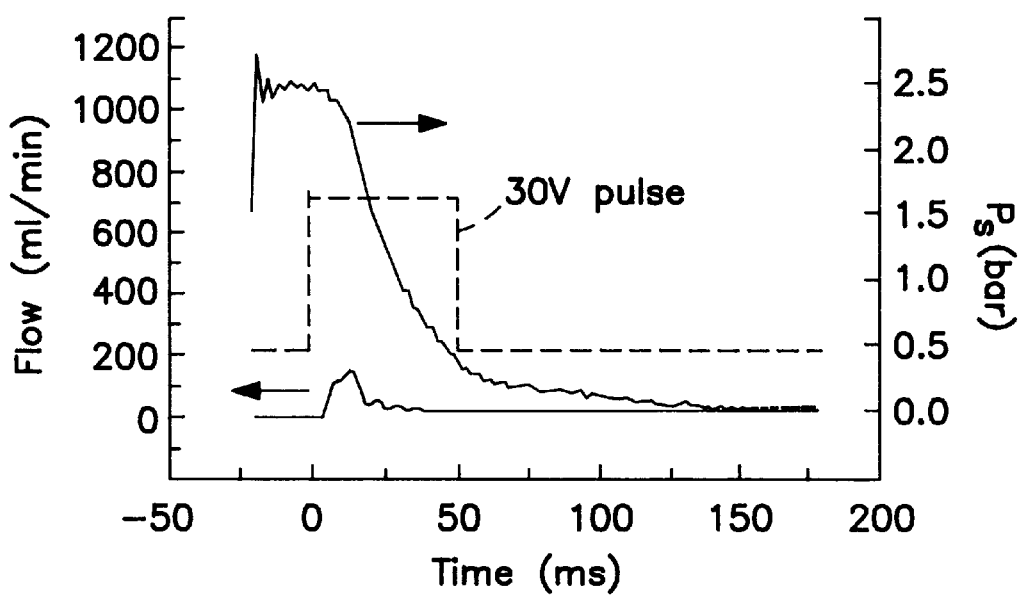
FIG. 7 depicts a measurement curve of the opening of the output valve.

FIGS. 6 and 7 depict measurement curves for an input pressure of 2.5 bar, which substantiate the switching operations described supra.

FIG. 6 depicts the flow of gas through the flow rate sensor 12 or the increase in pressure at the pressure sensor 11 ($p_s$) when the intake valve is energized for 50 ms at a power of 4.5 W and an input pressure of 2.5 bar.

FIG. 7 depicts the flow of gas through the flow rate sensor 12, or the pressure drop at the pressure sensor 11 ($p_s$), during energization of the output valve 8 for 50 ms at a power of 4.5. W and an input pressure of 2.5 bar. The brief gas flow recognizable in FIG. 7 shows the closure of the intake valve 7 resulting from the pressure drop in the switch during energization of the output valve 8. The volumes of the switch and of the switching element are determinative of the switching intervals. The bistability of the switch is clearly demonstrated by the measurement curves of FIGS. 6 and 7. If the electrical pulse is too short, pressure will after a certain time be reduced to its initial value. About 1 cm$^3$ of gas was consumed for each switching cycle (on and off). Aside from $N_2$, $CO_2$ available in small gas cartridges may also be used as operating gas. The effective consumption of electrical energy is minimal. The obtainable forces and control movements are high.

Using a valve arrangement of the kind herein described would make it possible, for instance, to construct a micro analytical system on the basis of silicon wafers. With the sensor elements, only passive structures need be integrated into the analytical system. Active elements (valve drives and amplifiers) may be applied in a hybrid manner. While, the drive is thus separated from any valve media, the analytical system, which because of its structure in the $\mu$m-size range is prone to be soiled by samples, for instance, may be replaced relatively easily. For that reason, it is relatively inexpensive.

What is claimed is:

1. A valve arrangement for controlling the movement of a fluid pressure operated switching member between first and second positions, comprising:

a micro-valve connected to the switching member and comprising a valve seat and a closure member selectively energizable for changing from a closed state to an open state through an idle state to admit fluid into a chamber up to a predetermined pressure for moving the switching member in a first direction between the first and second positions thereof, the closure member assuming its idle state when the predetermined pressure has been reached and returning to its closed state at a pressure below the predetermined pressure;

a second valve connected to the switching member and selectively energizable from a closed state to an open state for evacuating the fluid pressure for moving the switching member in an opposite direction between the second and first positions thereof.

2. The valve arrangement of claim 1, wherein a gap is formed between the valve seat and the closure member in its idle state for pressure compensation.

3. The valve arrangement of claim 2, further comprising means for forming a chamber for connecting the switching member to the micro-valve and the second valve.

4. The valve arrangement of claim 3, wherein the second valve is a micro-valve comprising a valve seat and a closure member selectively energizable for changing from a closed state to an open state to evacuate the pressure, said closure member returning to its closed state when the pressure is below the predetermined pressure.

5. The valve arrangement of claim 3, wherein the chamber comprises first and second separate sections and wherein the micro-valve comprises an intake duct in one of the first and second sections and the second valve comprises an output duct in the other of the first and second sections.

6. The valve arrangement of claim 5, wherein the micro-valve is disposed on a first chip and the second valve is disposed on a second chip in superposed relationship over the first chip.

7. The valve arrangement of claim 1, wherein the closure member is energized by one of magnetic, piezo-electric and thermo-mechanical means.

8. The valve arrangement of claim 7, wherein the valves are mounted on a common chip support in a side-by-side relationship.

9. The valve arrangement of claim 8, wherein the micro-valve and the second valve are integrated in a common chip.

* * * * *